March 22, 1949.  K. B. KENNEDY  2,464,934
FLAT TIRE INDICATOR
Filed Feb. 3, 1947

INVENTOR.
KENNETH B. KENNEDY
BY
Wm. H. Dean
AGENT

Patented Mar. 22, 1949

2,464,934

UNITED STATES PATENT OFFICE 2,464,934

FLAT TIRE INDICATOR

Kenneth B. Kennedy, San Diego, Calif.

Application February 3, 1947, Serial No. 726,133

4 Claims. (Cl. 200—58)

My invention relates to a flat tire indicator, more particularly for use in connection with motor vehicles having pneumatic tires and the objects of my invention are:

First, to provide an indicator of this class which employs a small round tire engaging arm which is not unduly affected by wind resistance encountered in high speed driving or by weeds or similar obstructions in the road over which an automobile equipped with my indicator is driving;

Second, to provide an indicator of this class which may be readily installed in connection with the spring mounting bolts or other features of the automobile chassis as desired;

Third, to provide an indicator of this class which may be so precisely adjusted that it will indicate by electric alarm any worn bushing in the front wheel assembly of motor vehicles when in operation;

Fourth, to provide an indicator and electric alarm of this class which will show undue deflection of the front wheels, also undue longitudinal thrust of rear axles when turning a corner;

Fifth, to provide an indicator of this class which will indicate wheels which are slightly bent or loose on the axle;

Sixth, to provide an indicator of this class in which an electrical alarm adapted to be positioned under the instrument panel of an automobile for warning the operator is in circuit with tire deflection switches, thereof, of any of a variety of dangerous conditions;

Seventh, to provide an indicator of this class which may be connected with the automobile ignition switch preventing the buzzer in connection therewith from operating in case a tire becomes flat when the automobile is not in operation;

Eighth, to provide an indicator of this class when electrically connected with the automobile ignition switch will signal before starting an automobile on a flat tire which has been unobserved by the operator thereof prior to starting the automobile;

Ninth, to provide an indicator of this class which is very reliable in various conditions such as operation in mud, water, sand, rocks, weeds and other obstructions; and Tenth, to provide an indicator of this class which is very simple and economical of construction, efficient in operation and which will not readily deteriorate or get out of order.

Figure 1:
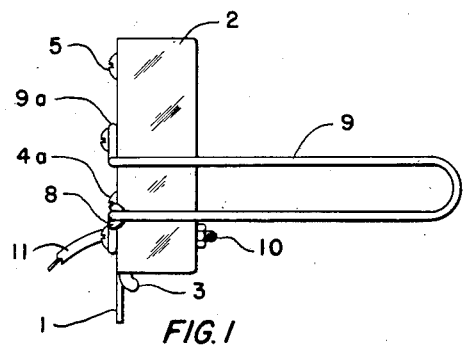
Figure 2:
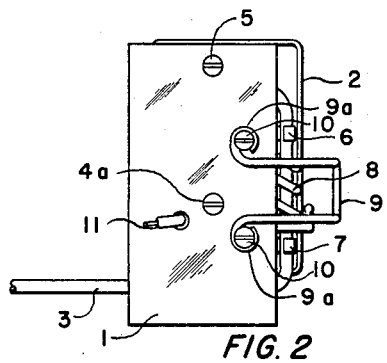
Figure 3:
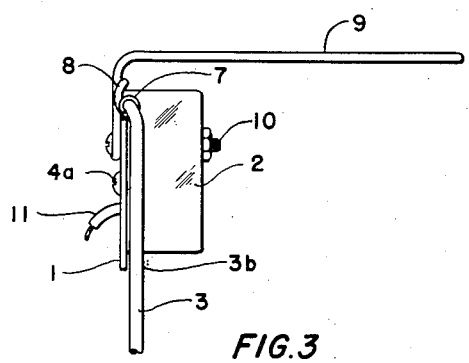
Figure 4:
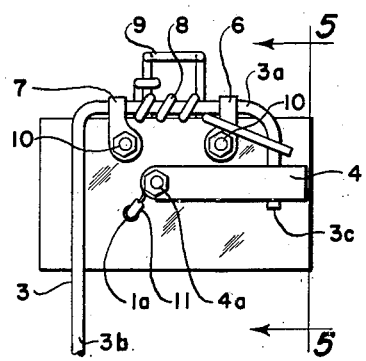
Figures 6, 7:
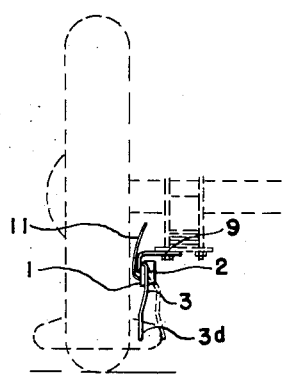
Figure 5:
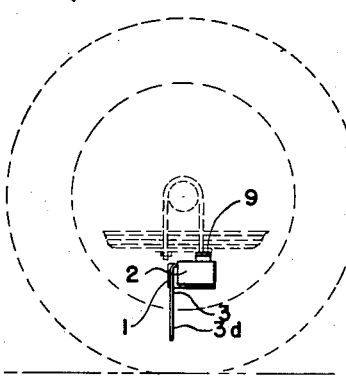

With these and other objects in view, as will appear hereinafter, my invention consists of certain novel features of construction, combination and arrangement of parts and portions as will be hereinafter described in detail and particularly set forth in the appended claims, reference being had to the accompanying drawing and to the characters of reference thereon forming a part of this application in which:

Fig. 1 is a top or plan view of my flat tire indicator, Fig. 2 is a fragmentary side elevational view thereof, Fig. 3 is a fragmentary front elevational view thereof, Fig. 4 is a side elevational view thereof showing the opposite side of that as shown in Fig. 2 and showing the cover thereof removed, Fig. 5 is a sectional view taken from the line 5—5 of Fig. 4, Fig. 6 is a front elevational view of my flat tire indicator shown in connection with the spring structure of an automobile and in relationship to the tire in connection with one of the automobile wheels and Fig. 7 is a side elevational view of my flat tire indicator similar to that as shown in Fig. 6, taken substantially 90 degrees therefrom.

Similar characters of reference refer to similar parts and portions throughout the several views of the drawing.

The frame plate 1, cover 2, contact arm 3, switch contact 4, stop screw 5, bearings 6 and 7, spring 8, bracket 9, bolts 10 and the conductor 11 constitute the principal parts and portions of my flat tire indicator.

The frame plate 1 is preferably made of electrical insulation. Secured in connection therewith by means of the bolts 10 are the bearings 6 and 7 in which the laterally disposed portion 3a of the contact arm 3 is pivotally mounted. At opposite sides of the frame plate 1, these bolts 10 support the opposite ends of the bracket 9 which are provided with eye portions 9a through which said bolts 10 extend, all as shown best in Fig. 2 of the drawing. The spring 8 is a coil torsion spring positioned around the laterally disposed portion 3a of the contact arm 3 and this spring 8 tends to hold the downwardly extending portion 3b of the contact arm 3 against the frame plate 1 as shown best in Fig. 3 of the drawing. It will be noted that one end of the spring 8 engages the contact end portion 3c of the contact arm 3 and tends to hold the same away from the switch contact 4. This switch contact 4 at its end adjacent the end portion 3c of the contact arm 3 is supported by the stop screw 5 which maintains the same in spaced relation with the contact end portion 3c of the contact arm 3. The opposite end of the switch contact 4 is secured to the frame plate 1 by means of the bolt 4a around which the electrical conductor 11 is secured. This electrical conductor 11 extends through an opening 1a in the frame plate 1 and outwardly to a conventional buzzer not shown in the drawing. The cover 2 encloses the operating mechanism of my flat tire indicator preventing mud and other foreign matter from contacting the same. It will be here noted that one of the bolts 10 extend through the cover 2 and maintain the same securely engaged with the plate 1. Thus, the bolts 10 are each provided with nuts, one adjacent the bearings 6 and 7, the other bolt 10 at the outer side of the cover 2 is provided with an additional nut. The contact arm 3 is provided with a tire engaging end portion 3d which is maintained in slight spaced relation with a normally inflated tire, as shown best in Fig. 6 of the drawing.

The operation of my flat tire indicator is substantially as follows:

When a tire becomes substantially deflated it is deflected laterally and engages the end portion 3d of the contact arm 3. When the contact arm 3 is deflected backwardly from the plate 1, the end portion 3c thereof contacts the switch contact 4 closing the circuit to the chassis of the vehicle. In this manner the circuit from the grounded side of the battery passes through the chassis of the vehicle to the contact arm 3 through the switch contact 4 and backwardly through the conductor 11 to the buzzer or other signaling device having electrical contact with the opposite pole of said battery. When such circuit is completed, the signal in the operator's compartment of the vehicle is intermittently operated indicating the deflated condition of the automobile tire. Other irregularities of the running gear of the automobile are indicated such as crooked wheels, loose bushings and other dangerous conditions. It will be here noted that small diameter of the contact arm 3 affords relatively slight wind resistance when the automobile is operating at high speed and that deflection thereof longitudinally of the axis of the automobile does not cause switching deflection. Thus, it will be seen that lateral deflection of the contact arm 3 must be accomplished substantially parallel to the axis of the wheels in order to effect the operation of the alarm. The thin proportions of the contact arm 3 provides a minimum amount of resistance when the lower end thereof is contacted by mud or other objects whereby the resilience of said contact arm 3 prevents the same from becoming damaged. As shown in Fig. 1 of the drawing, the bracket 9 is substantially U-shaped and is readily adapted to be connected with the conventional spring U bolts or other similar bolts and the elongated U-shaped character of this bracket 9 provides adjustable mounting arrangement of my flat tire indicator in connection with the structure of an automobile as desired.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a flat tire indicator of the class described the combination of a thin contact arm, a non-conducting plate mounted on a vehicle axle structure, bearings in connection with said non-conducting plate in which said contact arm is pivotally mounted on an axis substantially parallel with the longitudinal axis of an automobile on which said non-conducting plate is adapted to be mounted, a switch contact resiliently supported in connection with said non-conducting plate, arranged to be contacted by said contact arm when pivoted in said bearings.

2. In a flat tire indicator of the class described the combination of a thin contact arm, a non-conducting plate mounted on a vehicle axle structure, bearings in connection with said non-conducting plate in which said contact arm is pivotally mounted on an axis substanitally parallel with the longitudinal axis of an automobile on which said non-conducting plate is adapted to be mounted, said contact arm adapted to extend downwardly into adjacent relationship with the tire of an automobile wheel, a switch contact resiliently supported in connection with said non-conducting plate arranged to be contacted by said contact arm when pivoted in said bearings, a bracket substantially U-shaped having opposite ends adjacent said bearings and bolts extending through said bearings and opposite ends of said U-shaped bracket for holding the same in connection with said non-conducting plate.

3. In a flat tire indicator of the class described the combination of a thin contact arm, a non-conducting plate mounted on a vehicle axle structure, bearings in connection with said non-conducting plate in which said contact arm is pivotally mounted on an axis substantially parallel with the longitudinal axis of an automobile on which said non-conducting plate is adapted to be mounted, said contact arm adapted to extend downwardly into adjacent relationship with the tire of an automobile wheel, a switch contact resiliently supported in connection with said non-conducting plate arranged to be contacted by said contact arm when pivoted in said bearings, a bracket substantially U-shaped having opposite ends adjacent said bearings, bolts extending through said bearings and opposite ends of said U-shaped bracket for holding the same in connection with said non-conducting plate and a cover arranged to enclose said switch contact and said bearings at one side of said non-conducting plate.

4. In a flat tire indicator of the class described the combination of a thin contact arm, a non-conducting plate mounted on a vehicle axle structure, bearings in connection with said non-conducting plate in which said contact arm is pivotally mounted on an axis substantially parallel with the longitudinal axis of an automobile on which said non-conducting plate is adapted to be mounted, said contact arm adapted to extend downwardly into adjacent relationship with the tire of an automobile wheel, a switch contact resiliently supported in connection with said non-conducting plate arranged to be contacted by said contact arm when pivoted in said bearings, a bracket substantially U-shaped having opposite ends adjacent said bearings, bolts extending through said bearings and opposite ends of said U-shaped bracket for holding the same in connection with said non-conducting plate, a cover arranged to enclose said switch contact and said bearings at one side of said non-conducting plate and a spring for holding said contact arm away from said switch contact.

KENNETH B. KENNEDY.

REFERENCES CITED

The following references are of record in the file of this patent:

UNITED STATES PATENTS

| Number | Name | Date |
|---|---|---|
| 1,785,614 | Boyer | Dec. 16, 1930 |
| 2,258,334 | Miller | Oct. 7, 1941 |
| 2,317,509 | Anderson | Apr. 27, 1943 |

FOREIGN PATENTS

| Number | Country | Date |
|---|---|---|
| 631,289 | France | Sept. 12, 1927 |
| 634,972 | France | Dec. 10, 1927 |
| 642,556 | France | May 6, 1928 |
| 673,313 | France | Apr. 15, 1930 |